United States Patent
Soroker et al.

(10) Patent No.: US 7,810,078 B2
(45) Date of Patent: Oct. 5, 2010

(54) SYSTEM AND METHOD FOR CONSTRUCTING COMPUTER APPLICATION FLOWS WITH SPECIALIZATIONS FOR TARGETS

(75) Inventors: Danny Soroker, Larchmont, NY (US); Guruduth Somasekhara Banavar, Yorktown Heights, NY (US); Lawrence David Bergman, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1870 days.

(21) Appl. No.: 10/316,252

(22) Filed: Dec. 10, 2002

(65) Prior Publication Data
US 2004/0111711 A1  Jun. 10, 2004

(51) Int. Cl.
*G06F 9/44* (2006.01)

(52) U.S. Cl. .................. 717/132; 717/107; 717/108; 717/113

(58) Field of Classification Search .......... 717/100–122
See application file for complete search history.

(56) References Cited

U.S. PATENT DOCUMENTS

| | | | | |
|---|---|---|---|---|
| 5,187,788 A | * | 2/1993 | Marmelstein | 717/109 |
| 5,390,330 A | * | 2/1995 | Talati | 717/104 |
| 5,535,322 A | * | 7/1996 | Hecht | 705/1 |
| 5,815,415 A | * | 9/1998 | Bentley et al. | 703/4 |
| 5,946,485 A | * | 8/1999 | Weeren et al. | 717/109 |
| 6,023,578 A | * | 2/2000 | Birsan et al. | 717/105 |
| 6,424,991 B1 | * | 7/2002 | Gish | 709/203 |
| 6,996,800 B2 | * | 2/2006 | Lucassen et al. | 717/106 |

* cited by examiner

*Primary Examiner*—Chuck O Kendall
(74) *Attorney, Agent, or Firm*—Derek S. Jennings; Anne Vachon Dougherty

(57) ABSTRACT

A method and supporting application-development tool are provided for building such a set of application flows. The method includes the steps of (a) a developer obtaining a "generic" flow model for the application; (b) the developer specifying the set of targets; (c) automatically creating a specialized flow model for each of the targets; (d) the developer modifying at least one of the generic flow model and the specialized flow models; (e) automatically generating specialized applications corresponding to the specified specialized flow models; and (f) deploying the specialized applications on the corresponding targets.

19 Claims, 4 Drawing Sheets

US 7,810,078 B2

SYSTEM AND METHOD FOR CONSTRUCTING COMPUTER APPLICATION FLOWS WITH SPECIALIZATIONS FOR TARGETS

FIELD OF THE INVENTION

The present invention relates to application development tools for computer applications, and more particularly relates to a system and method for developing an application flow with specializations for a plurality of different computing targets.

BACKGROUND OF THE INVENTION

Application development tools (AD tools) are computer programs that aid developers in developing computer applications. When working with such tools, the developer creates an application employing some underlying programming model that will run on a target computing device, for a target user, or at a target location. The task of developing applications is complex, especially when developing applications that can run for a plurality of targets. A primary role of AD tool programming (and the underlying programming model) is to provide assistance in handling this complexity. For example, modern AD tools typically have a graphical user interface through which the developer interacts with the system, creating, modifying, testing, and deploying the application.

A commonly used programming model that helps deal with application complexity is called the "Model View Controller" (MVC) model. In the MVC model an application is decomposed into three parts: the "Model" which encapsulates the application logic and data, the "View" which encapsulates the part of the application visible to the end user, and the "Controller" which encapsulates the application control flow and connections between the model and the view. The flow aspects of the controller can be represented as a directed graph in which the nodes correspond to application states and the arcs correspond to transitions between states. An application state includes, but is not limited to, a presentation (e.g., a Web page) or a process (e.g., a purchase approval step within a workflow). Given this modeling, the flow control lends itself well to manipulation via a graphical editor. Use of the MVC programming model is known in the art, as are AD tools that support this model. In particular, AD tools that employ a graphical flow editor are known in the art.

Another field where control flow is used is in workflow systems and tools, such as the SAP Workflow Editor*, the Tallence Workflow Engine*, or the DataWorks Workflow Editor* (*denotes that the term or terms may be trademark(s) of the respective owner), where diagrams are used to describe states and state dependencies in a system or organization. Control flow is also employed in systems, such as that detailed in U.S. Pat. No. 6,212,672, of Keller, et al, entitled "Software Development System with an Executable Working Model in an Interpretable Intermediate Modeling Language," in which a higher level intermediate representation is used to generate desired artifacts. Another usage is in hardware design systems, such as Translogic Ease*, where a state diagram captures the control flow of a system or subsystem.

Existing tools concentrate on developing a single application flow. When developing an application for multiple targets, such as target devices with different capabilities or target users in different roles (e.g., bank customer versus bank employee), the approaches known in the art include either creating a separate control flow for each target or having a single control flow shared by all targets. To create a separate flow for each target is highly development-intensive, while using a single control flow for all targets is less than optimal from a performance perspective. There is no known system or method in the art that supports development of a common control flow having variations for multiple targets.

With the emergence of pervasive computing, AD tools for building applications targeted at multiple computing devices, such as laptops, PDAs, cell phones, etc., have appeared in the last few years. In Microsoft's .NET Studio*, specifically in the Mobil Internet Tool Kit*, a developer is able to write an application once and run it on multiple devices by deploying the application to a server that adaptively renders the application based on the requesting device. However, the control flow through the application's presentation elements, such as pages, is common across all targets, and is not specified visually at a high-level.

Accordingly, for development of a single application intended to be run for multiple targets, there remains a need in the art for a flow editor that creates and maintains a common, target independent flow with target dependent specializations.

It is therefore an objective of the present invention to provide a system and method for creating a common flow having target-specific specialized flows.

SUMMARY OF THE INVENTION

The foregoing and other objectives are realized by the present invention which provides a method and tool for developing application flows for a plurality of closely-related application implementations. The method is intended for use, for example, when developing an application to run on a plurality of target computing devices or groups of devices, for a plurality of target users or groups of users, or in a plurality of target locations or groups of locations. A method and supporting application-development tool are provided for building a set of application flows. The method includes the steps of (a) the developer obtaining or creating a "generic" flow model for the application; (b) the developer specifying the set of targets; (c) automatically creating a specialized flow model for each of the targets; (d) the developer modifying the generic flow model and the specialized flow models; (e) automatically generating specialized applications corresponding to the specified specialized flow models; and (f) deploying the specialized applications on the corresponding targets.

For a better understanding of the present invention, together with other and further features and advantages thereof, reference is made to the following description, taken in conjunction with the accompanying drawings.

BRIEF DESCRIPTION OF THE DRAWINGS

The invention will hereinafter be described with specific reference to the appended drawings wherein.

DETAILED DESCRIPTION OF THE INVENTION

Figure 1:
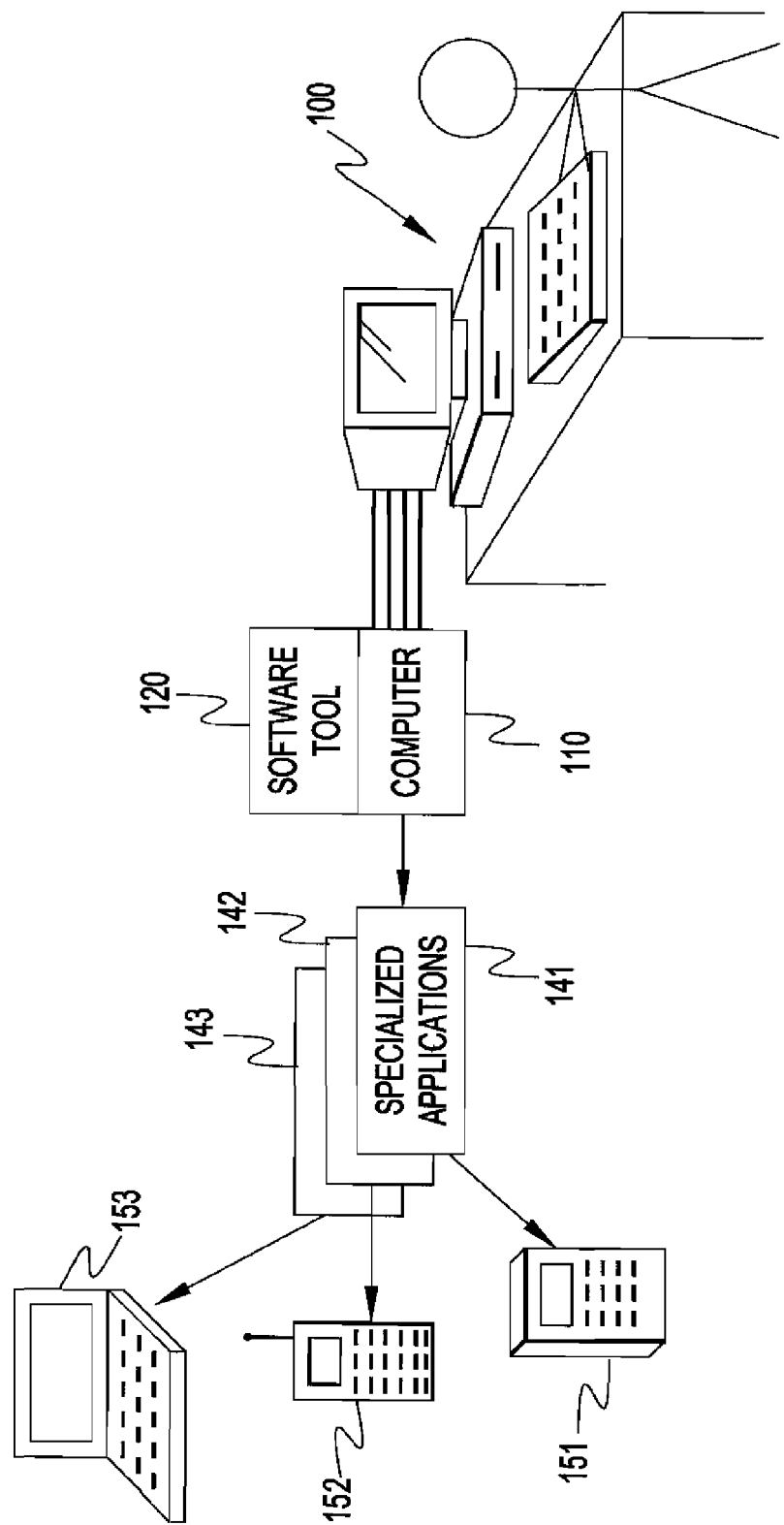
FIG. 1 provides a graphical depiction of a system for implementing the present invention.

The inventive system and method provides a developer with an ability to construct applications for multiple targets from a generic process flow. The term "targets" will be used hereinafter to refer to different computing modes for which different process flows of the same application may be appropriate, including, but not limited to, target devices (e.g., laptops, personal digital assistants, PDAs, cell phones, etc.), target users (e.g., different users of an application), target locations, and groups of the foregoing. The method comprises the steps of (a) the developer obtaining a "generic" flow model for the application by either creating a generic flow model or retrieving a previously-created one; (b) the developer specifying the set of targets; (c) automatically creating a specialized flow model for each of the targets; (d) the developer modifying the generic flow model and the specialized flow models; (e) automatically generating specialized applications corresponding to the specified specialized flow models; and (f) deploying the specialized applications for the corresponding targets. After the step of modifying the flow models, the developer can choose to return to the step of specifying the targets and repeat the ensuing steps of creating and editing the flow models, generating the applications, and deploying the generated applications for targets.

The developer interacts with the application-development tool to build a "generic" flow model (i.e. one that serves as the basis of the specialized application flows). Application flow is typically represented as a graph, with nodes representing states, and arcs representing transitions between states. The tool, therefore, preferably, has a graphical component for representing this graph. In the step for specifying the targets, step (b) above, which may be repeated multiple times, the developer specifies a list of targets, which may be taken from a repository of known devices, known users, known locations, etc. In step (c), for each new target specified, a specialized flow, which corresponds to the currently specified generic flow, is automatically created by the system. In step (d), the developer interacts with the tool to edit one or both of the generic flow and the specialized flows. Changes in the generic flow (such as adding or removing a node), are immediately reflected through the automatic generation of new specialized flows. However, a change in a specialized flow is maintained for that flow only. Thus, at every point in the development process, the generic flow captures the common basis of all of the specialized flows. In step (e), the tool generates specialized applications based on the flows which have been constructed within the tool. Note that this generation process may have other inputs besides the application flows, as further detailed below. In step (f), the developer can run and test the resultant specialized applications by deploying them for the set of targets. Application deployment may, preferably, also be assisted by the tool.

A graphical illustration of a system for implementing the present invention is provided in FIG. 1. As illustrated therein, an application developer 100 uses a computer system 110 which is executing a software tool 120. The software tool embodies the methodology for constructing application flow specializations, the method for which is described in greater detail below with reference to FIG. 3. As a result of usage, either through explicit user action, or through execution of programmed commands, the software tool generates a set of specialized applications 141-143. Each of these specialized applications is targeted to and deployed for a particular kind of target 151-153, shown as devices comprising a cell phone, a PDA, and a desktop computer. Three specialized applications for three targets are illustrated. However, it should be clear that any number of specialized applications can be developed for a corresponding number of targets and that the targets can include, but are not limited to, target devices, target users, target locations, and groups of the foregoing.

Figure 2:
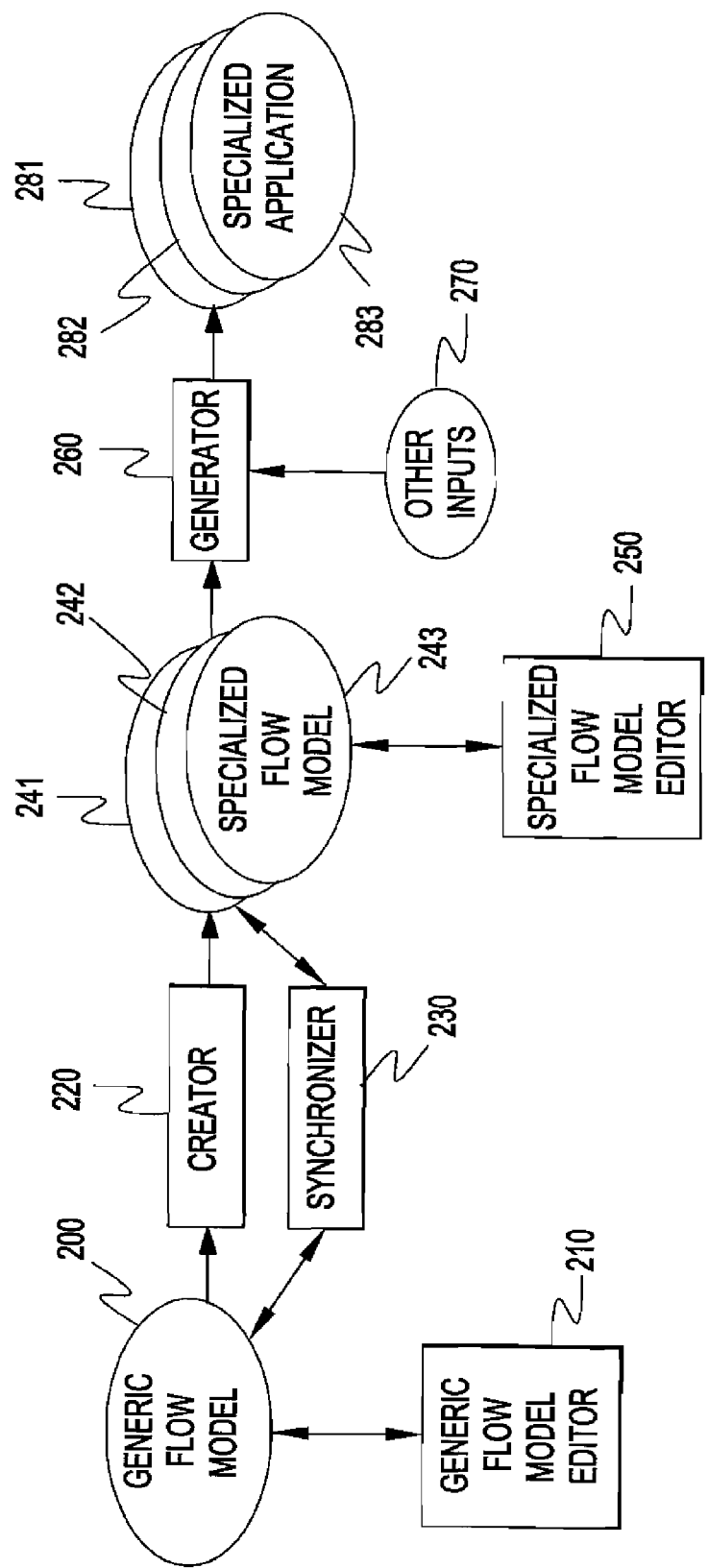
FIG. 2 illustrates a graphical representation of the architecture of the inventive tool.

FIG. 2 illustrates the architecture of the software tool. A generic flow model 200 is created using a generic model editor 210. The generic flow model is a data structure that describes the application states (for example, web pages), and the transitions between them. The flow model might be represented as a directed graph, stored in any of the conventional ways used to store such data structures. Nodes within the directed graph will typically represent abstract entities within an application, for example a generic page containing a set of generic abstract widgets (e.g., an Xforms document). Arcs in the graph represent navigation between nodes, (e.g., hyperlinks).

The generic flow model editor 210 is used to create and manipulate the flow model. The generic flow model editor might be a drag-and-drop graphical editor for creating and editing graph structures, although other types of editors including text editors can be envisioned.

Once a generic flow model has been created, specialized flow models 241-243 are automatically created by a specialized flow model creator, illustrated as creator module 220, one for each target for which the application is to be deployed. The specialized flow model is structurally identical to the generic flow model, differing only in the types and instances of states. It is to be noted that it is possible to use the same types and instances of states within the specialized and generic flow models; in which case the creator module is simply performing a copy. Entities within the specialized flow model represent concrete elements of the application user interface. Nodes within the specialized flow model typically represent concrete entities, for example actual pages or sets of pages, each containing descriptions of widgets that can be realized using the user-interface library for the target.

Each individual specialized flow model, 241, 242, or 243, can be edited by the developer using a specialized model editor 250. This editor, which may be quite similar to the generic model editor or even be the same editor operating in a different mode, may support a number of editing operations on the specialized flow model including, but not limited to, deletion of nodes, deletion of arcs, addition of nodes, addition of arcs, and splitting of nodes. The editing operations can be performed graphically on a graphical representation of the specialized flow model, textually on a textual representation, or by some other individual or combination of known editing interactions.

A synchronizer 230 is responsible for maintaining synchronization between the specialized flow models and the generic flow model. When changes are made to the generic flow model, previously generated and possibly edited specialized flow models are updated to reflect the changes. The synchronizer ensures that such changes are reflected. Certain changes to the specialized flow models may also be synchronized back to the generic flow and then reflected to all other specialized flows (e.g., visual presentation properties of an application state within a visual editor).

At any time, one or more of the specialized flow models can be deployed for the targets for testing or use. Deployment is managed by passing each specialized flow module as input into a generator module 260, which creates each target-specific specialized application 281-283. The target-specific applications can be expressed in any of a number of markup languages (e.g., HTML, WML, CHTML) or other computer languages (e.g., Java*). The generator module may additionally accept a variety of other inputs 270, which might include view and layout information (Java Server Pages*, for example), device characteristics, user profile information, or location characteristics.

Figure 3:
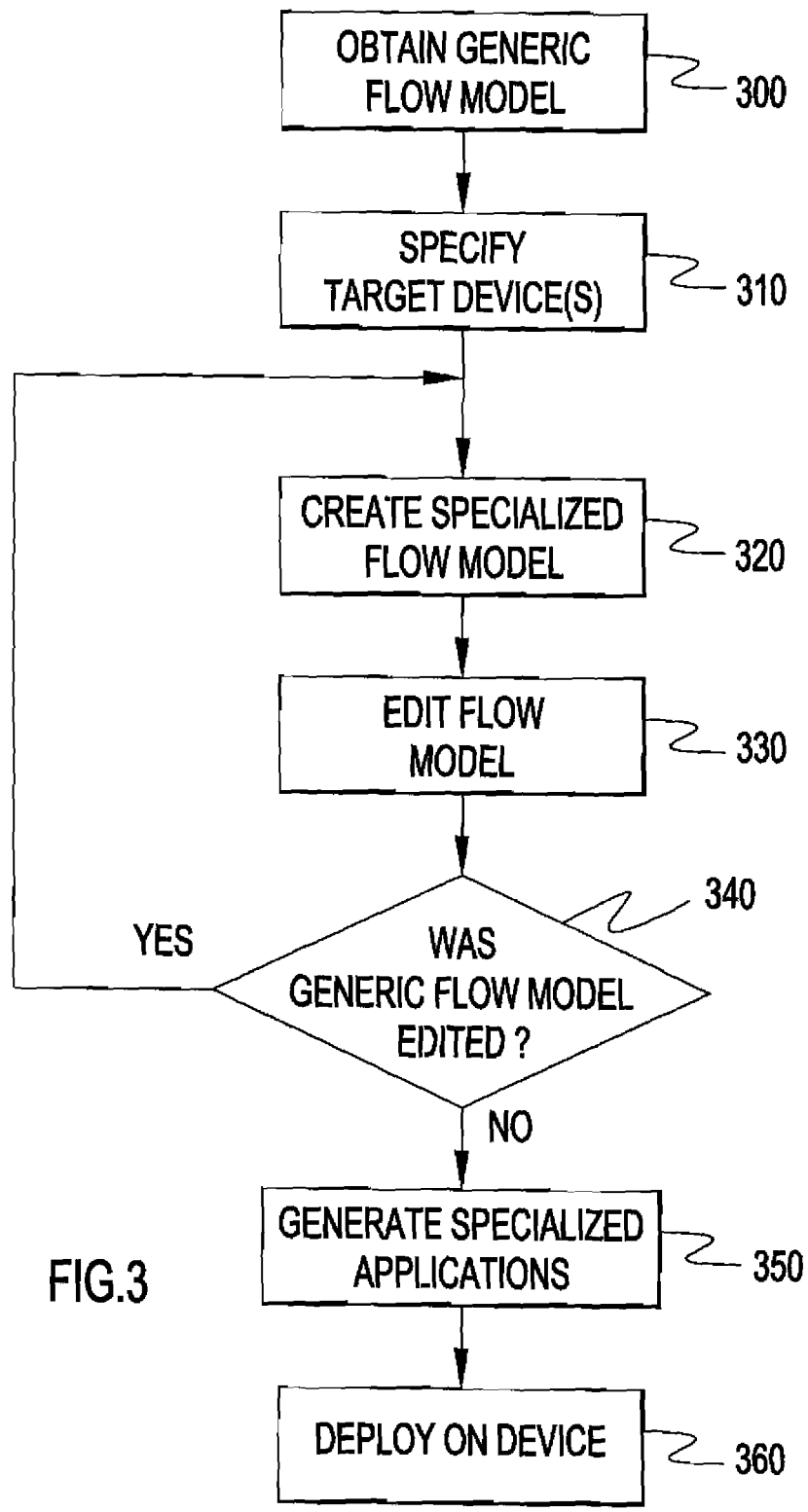
FIG. 3 provides a representative process flow for implementing the present invention.

FIG. 3 illustrates the development process that is employed by an application developer and the computer system using the proposed method. There are two entry points to the illustrated procedure. The developer may begin by creating a new application with a first step of creating a generic flow model. Alternatively, the other entry point in the process is to begin by adding a new target for an already-specified generic flow model. Step 300 of FIG. 3 shows a step of obtaining the generic flow model, which step encompasses either the creating of a new generic flow model or the retrieval of an already-specified generic flow.

The initial step is followed by a step of specifying information on one or more targets at 310. Target information may be specified directly, as a set of target characteristics (e.g., user characteristics, device characteristics such as screen size, presence/absence of hard buttons, browser tag language, etc.) or by specifying an entry in a separate target characteristics database. Once the developer has specified a generic flow model and a set of targets, the system automatically creates a specialized flow model for each target at 320. At this point, the developer may edit a flow model at 330. The developer can edit either the specialized flow model or the generic flow model. Note that editing of the generic flow model is necessarily reflected in each of the specialized flow models, while editing a specialized flow typically only results in changes to that flow. Accordingly, if it is determined at step 340 that the generic flow model has been edited, the process flow returns to step 320 to update the specialized flow models for each target. If editing only affected a specialized flow, the system proceeds to generate a specialized application at 350 for each specialized flow model, which application can then be deployed for a target at 360. The edit/generate/deploy process (330-360) can be repeated as many times as desired by the developer.

Figure 4A:
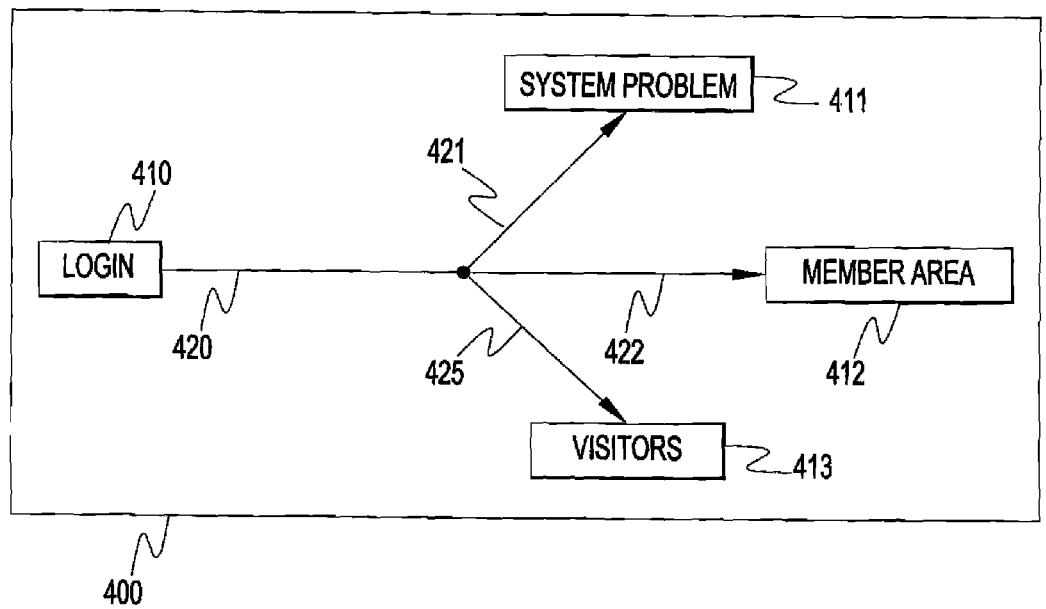
FIGS. 4A and 4B illustrate sample generic and specialized flows for an application developed and displayed in accordance with the present invention.
Figure 4B:
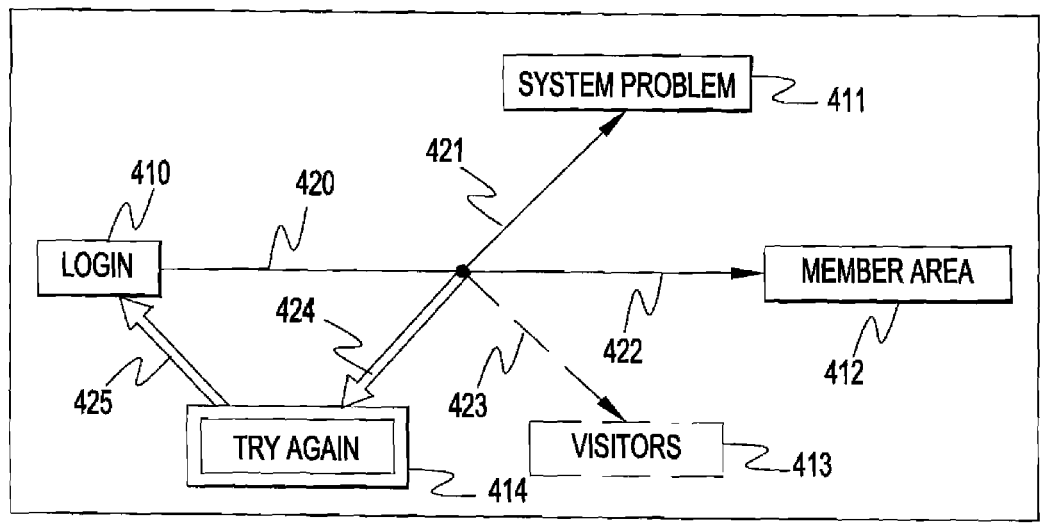

FIGS. 4A and 4B illustrate sample generic and specialized flows for an application developed and presented by the software took 120 of FIG. 1. In FIG. 4A, the generic application 400 is shown. The generic application flow graph can contain nodes, 410-413, of various types, and transitions, 420-423, of various types. The application shown contains 5 nodes and 4 transitions.

FIG. 4B shows one representative display of a specialized application 430 which corresponds to the generic application 400 of FIG. 4A. The specialized application graph contains some nodes, 410-412, which correspond to the generic nodes and some transitions, 420-422, which correspond to the generic transitions. Note that the example nodes and transitions are displayed in a visually corresponding manner in the generic flow and the specialized flow. Some nodes from the generic application may, however, be missing from the specialized application, such as 413. Some transitions from the generic application, such as 423, may also be missing from the specialized application. Note that the missing nodes and transitions are displayed in the specialized flow, but are visibly altered, so as to maintain a visual correspondence and/or differentiation between the generic flow and the specialized flow. The specialized flow may further contain new nodes, 414, and transitions, 424-425, which do not have a generic counterpart. Note that these new nodes and transitions may be displayed differently so as to distinguish them from nodes and transitions that have a generic counterpart. With the applications being displayed as illustrated, editing by the developer is facilitated.

The invention has been detailed with reference to several specific embodiments. One having skill in the relevant art will understand that modifications can be made to the described invention, for example based on available devices, available editing tools, etc., without departing from the spirit and scope of the invention as set forth in the accompanying claims.

What is claimed is:

1. A computer-implemented method for developing an application to run for a plurality of different computing targets comprising a computer system executing a software tool for performing the steps of:
   obtaining a generic flow model for application development;
   specifying at least one target for said application;
   automatically creating a specialized flow model for each of said at least one target;
   editing at least one specialized flow model to produce an edited specialized flow model; and
   automatically generating a specialized application for each of said at least one target based on said edited specialized flow model.

2. The method of claim 1 further comprising deploying a specialized application to a corresponding one of said at least one target.

3. The method of claim 1 wherein said obtaining a generic flow model comprises creating said generic flow model.

4. The method of claim 1 wherein said obtaining a generic flow model comprises retrieving a previously-created generic flow model.

5. The method of claim 1 wherein said editing further comprises editing said generic flow model to create an edited generic flow model and wherein said process further comprises the steps of:
   automatically updating a new specialized flow model for each of said at least one target based on said edited generic flow model;
   editing said new specialized flow model to produce an edited new specialized flow model; and
   automatically generating a specialized application for each of said at least one target based on said edited new specialized flow model.

6. The method of claim 1 further comprising graphically displaying at least one of said generic flow model and said specialized flow model for editing.

7. The method of claim 1 wherein said creating a specialized flow model comprise creating a target-specific application flow diagram having a plurality of nodes and arcs, wherein each node represents an application state, each arc represents a transition between application states, and wherein arcs connect nodes.

8. The method of claim 3 wherein said creating a generic flow model comprise creating a target-independent application flow diagram having a plurality of nodes and arcs, wherein each node represents an application state, each arc represents a transition between application states, and wherein arcs connect nodes.

9. The method of claim 8 wherein said creating a specialized flow model comprise creating a target-specific application flow diagram having a plurality of nodes and arcs, wherein each node represents an application state, each arc represents a transition between application states, and wherein arcs connect nodes.

10. The method of claim 7 wherein said editing comprises graphically specifying changes to said target-specific application flow diagram.

11. The method of claim 7 wherein editing comprises at least one of deleting at least one node, deleting at least one arc, adding at least one new node and adding at least one new arc from one of said nodes to said at least one new node, wherein said at least one new node represents a target-specific application state.

12. The method of claim 1 wherein said at least one target is selected from the group consisting of target devices, target users, target locations, and groups of same.

13. A computer system for developing an application to run for a plurality of different computing targets comprising:

a computer for executing a software tool;

at least one user interface for user input specifying at least one target for said application and user editing input to displayed generic and specialized flow models;

a display; and a software tool comprising:

a generic flow model component for obtaining a generic flow model for application development;

a flow model creator component for automatically creating a specialized flow model for each of said at least one target;

a display handling component for displaying at least one of said generic and said specialized flow models and for receiving user editing input to said display to produce an edited flow model; and an application generating component for automatically generating a specialized application for each of said at least one target based on said edited flow model.

14. The system of claim 13 further comprising means for deploying said a specialized application to a corresponding one of said at least one target.

15. The system of claim 13 wherein said generic flow model component comprises means for creating said generic flow model.

16. The system of claim 15 wherein said display handling component comprises a graphical user interface for displaying graphical representations of said flow models and for receiving user input to said graphical representations.

17. The system of claim 16 wherein said generic flow model component comprise means for creating a target-independent application flow diagram having a plurality of nodes and arcs, wherein each node represents an application state, each arc represents a transition between application states, and wherein arcs connect nodes.

18. The system of claim 13 wherein said generic flow model component comprises flow model storage whereby obtaining a generic flow model comprises retrieving a previously-generated generic flow model from said storage.

19. The system of claim 16 wherein said flow model creator component is adapted to create a specialized flow model comprise creating a target-specific application flow diagram having a plurality of nodes and arcs, wherein each node represents an application state, each arc represents a transition between application states, and wherein arcs connect nodes for display and editing.

* * * * *